(12) United States Patent
Ceglia

(10) Patent No.: US 6,947,546 B2
(45) Date of Patent: Sep. 20, 2005

(54) HOOK-FLASH SIMULATION IN PARALLEL WITH OFF-HOOK DEVICES

(76) Inventor: Michael J. Ceglia, 1008 Abington Ter., Cherry Hill, NJ (US) 08034

( * ) Notice: Subject to any disclaimer, the term of this patent is extended or adjusted under 35 U.S.C. 154(b) by 459 days.

(21) Appl. No.: 09/954,995

(22) Filed: Sep. 18, 2001

(65) Prior Publication Data

US 2002/0039412 A1 Apr. 4, 2002

Related U.S. Application Data

(60) Provisional application No. 60/235,448, filed on Sep. 26, 2000.

(51) Int. Cl.[7] .............................. H04M 1/00; H04M 9/00
(52) U.S. Cl. .................... 379/393; 379/207.06
(58) Field of Search ..................... 379/90.01, 387.01, 379/393, 418, 207.06

(56) References Cited

U.S. PATENT DOCUMENTS

| | | | |
|---|---|---|---|
| 4,251,693 A | * 2/1981 | Christiansen | 379/387.01 |
| 4,351,986 A | 9/1982 | Fechalos | 379/163 |
| 4,387,274 A | 6/1983 | Stein | 379/393 |
| 4,613,730 A | 9/1986 | Fechalos | 379/355.01 |
| 4,926,461 A | 5/1990 | Kuok | 379/88.27 |
| 6,345,088 B1 | * 2/2002 | Gu et al. | 379/93.35 |

* cited by examiner

Primary Examiner—Curtis Kuntz
Assistant Examiner—Alexander Jamal

(57) ABSTRACT

A method for producing a hook-flash event on a loop (6B) incorporating a supervisory signal circuit. The supervisory signal circuit includes a supervisory signal source (2) that causes a supervisory current to flow around the loop through a threshhold detector device (4) and one or more supervised devices (10 and 24). When a counter-signal source (34) is connected to the loop, it opposes the flow of loop supervisory loop current (12), causing its level to drop below the detection threshhold of the threshhold detector device. After a timed period, the counter-signal source is disconnected from the loop, allowing the level of supervisory loop current to return to its normal state, thereby completing the hook-flash event on the loop.

2 Claims, 3 Drawing Sheets

LOOP 6B

LOOP 6B

HOOK-FLASH SIMULATION IN PARALLEL WITH OFF-HOOK DEVICES

CROSS REFERENCE TO RELATED APPLICATIONS

This application claims the benefit of U.S. Provisional Patent Application Ser. No. 60/235,448, filed Sep. 26, 2000.

BACKGROUND—FIELD OF THE INVENTION

This invention relates to the effective simulation of a hook-flash on a signal loop without opening the loop and despite the presence of a number of off-hook devices on that loop.

GLOSSARY

The term "cycled", as applied to the contact devices shown in the drawings, is intended to mean: "opened for a predetermined time interval, then re-closed" for normally-closed devices; and "closed for a predetermined time interval, then re-opened" for normally-open devices.

The term "counter-signal source" is intended to refer to a signal source that, when connected to a loop and algebraically summed with that loop's supervisory signal source, is capable of creating a threshhold breach.

The term "hook-flash" is intended to describe the timed threshhold breach of a loop's supervisory signal.

The term "loop" is intended to refer to any circuit incorporating a supervisory signal circuit, typically including a supervisory signal source, a supervisory current threshhold detector, any number of supervised devices connected to that circuit, the wiring necessary to interconnect those elements in a circuit, and the impedance inherent in that circuit.

The term "loop current" is intended to mean the supervisory signal current passing through a loop's supervisory signal current detector.

The term "supervised" is intended to apply to any device that is connected to a loop and, when connected as the only supervised off-hook device on that loop, is capable of causing a threshhold breach.

The term "supervisory" is intended to describe anything contributing to the ability to detect a threshhold breach on a loop.

The term "supervisory signal" is intended to mean any signal placed on a loop for supervisory purposes.

The term "threshhold breach" is, generally, intended to imply the detectable change in value of a supervised parameter from one side of a detection threshhold to the other. It is intended herein to imply a detectable change in the value of a supervised electrical current from one side of a current detection threshhold to the other.

BRIEF DESCRIPTION OF THE DRAWINGS

In FIG. 3A, the counter-signal source is disconnected from the loop, because the contact device in series with it is open. In FIG. 3B, the counter-signal source is connected to the loop, because the contact device in series with it is closed.

FIG. 4 and FIG. 4B are block diagrams, each illustrating a basic supervisory loop with a loop current, having component currents feeding a multiplicity of supervised devices, and having a contact-controlled counter-signal source connected to the loop conductors at a point in the loop at a distance from the multiplicity of supervised devices. In FIG. 4B, the counter-signal source is connected to the loop, because the contact device in series with it is closed.

LIST AND DESCRIPTIONS OF DRAWING ITEMS BY REFERENCE NUMBER

Item 2 is a loop supervisory signal source. It is also called, simply, supervisory signal source. Descriptive labelling on drawings is "SIG."

Item 4 is a loop supervisory current threshhold detector device that detects predetermined loop current values, and is thereby able to detect threshhold breaches. Throughout this text, any reference to a current detector of any kind refers to this device. Descriptive labelling on drawings is "CUR. DET."

Grouped elements 6 comprise a typical, basic supervised loop.

Grouped elements 6A comprise a typical, basic supervised loop having multiple, parallelled supervised devices and including a series-connected contact device so positioned in the loop that it is able to interrupt loop current regardless of the on-hook or off-hook states of the supervised devices.

Grouped elements 6B comprise a loop similar to loop 6A, additionally provided with a contact enabled, counter-signal source, parallelled with the supervised devices.

Grouped elements 6C comprise a loop similar to loop 6A, additionally provided with a contact enabled, counter-signal source, connected at a sufficient distance from the parallelled supervised devices that a significant component, impedance 8B, of the total loop impedance separates the counter-signal source from the parallelled supervised devices.

Figure 4A:
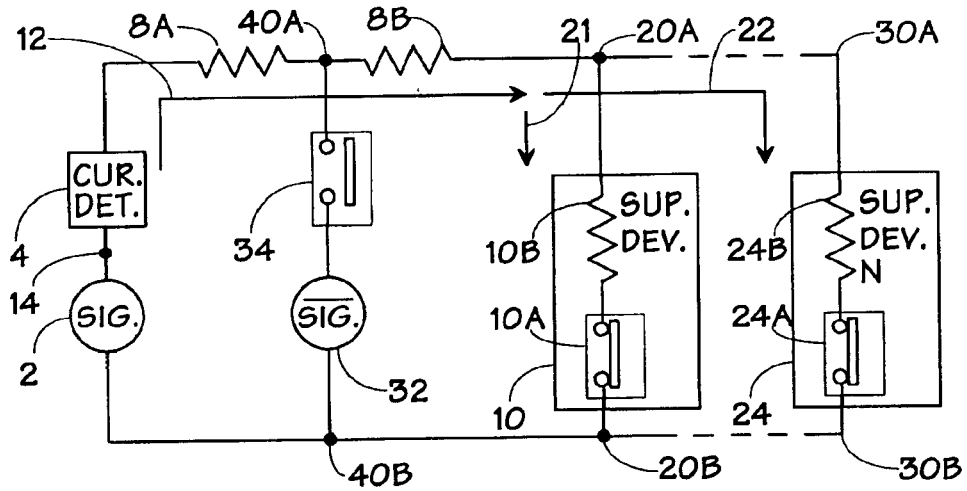
In FIG. 4A, the counter-signal source is disconnected from the loop, because the contact device in series with it is open.
Figure 4B:
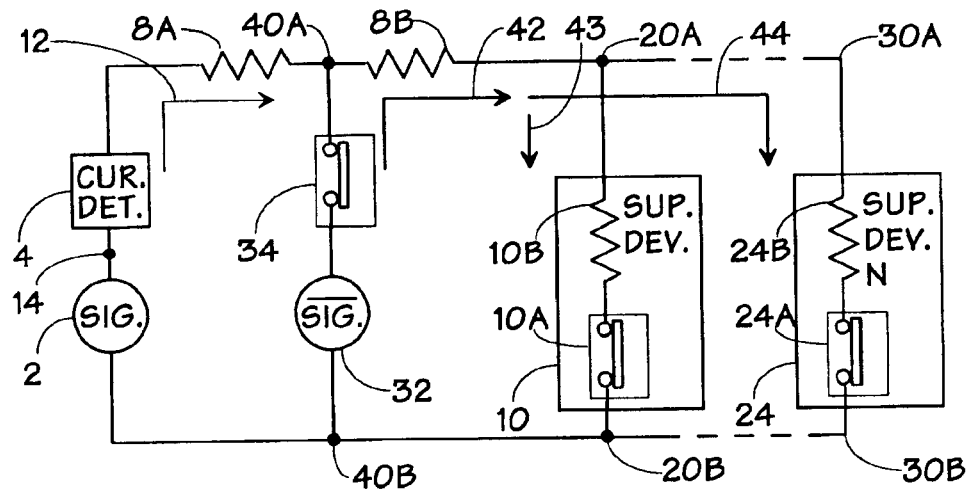

Item 8 represents the total impedance of the illustrated loop in all drawings except FIG. 4A and FIG. 4B, and excluding that of supervised devices connected to the loop. Typically, this impedance is distributed around the loop.

Items 8A and 8B represent, together, the total impedance of loop 6C, excluding that of the supervised devices connected to the loop. Typically, this impedance is distributed around the loop. Impedance 8A is intended to represent an arbitrary portion of the total impedance of loop 6C, and impedance 8B is intended to represent the remainder.

Item 10 represents a supervised device having supervisory signal circuitry, comprising an impedance and a contact device for opening and closing the loop circuit to place supervised device 10 in its on-hook and off-hook states, respectively. Supervised device 10 is shown in its off-hook state. Descriptive labelling on drawings is "SUP. DEV."

Item 10A represents a contact device within supervised device 10 that connects supervised device 10 to loop 6. When contact device 10A is closed, supervised device 10 is said to be off-hook. When it is open, supervised device 10 is said to be on-hook.

Item 10B represents the internal impedance of supervised device 10.

Item 12 designates the current, typically generated by loop supervisory signal source 2, that flows through loop current detector 4.

Item 14 represents a point on the loop between supervisory signal source 2 and current detector 4.

Points 20A and 20B are the two connection points of supervised device 10 to loops 6A, 6B, and 6C.

Item 21 designates the current component of current 12 that flows through supervised device 10.

Item 22 designates the current component of current 12 that flows through supervised device 24.

Item 23 represents a contact device so located and connected on loop 6A that it is capable of generating a hook-flash on the loop, regardless of any number of off-hook, supervised devices connected on that loop. Typically, this contact device is closed, as it is shown. When cycled, it opens, then re-closes.

Item 24 represents an additional supervised device having supervisory signal circuitry comprising an impedance and a contact device for opening and closing the loop circuit to place supervised device 24 in its on-hook and off-hook states, respectively. Supervised device 24 represents each of a number of supervised devices connected on loops 6A, 6B, and 6C in addition to supervised device 10. Supervised device 24 is shown in its off-hook state. Descriptive labelling on drawings is "SUP .DEV. N"

Item 24A represents a contact device within supervised device 24 that connects supervised device 24 to the loop. When contact device 24A is closed, supervised device 24 is said to be off-hook. When it is open, supervised device 24 is said to be on-hook.

Item 24B represents the internal impedance of supervised device 24.

Points 30A and 30B are the two connection points of supervised device 24 to loop 6.

Item 32 is a counter-signal source. Descriptive labelling on drawings is "SIG.", overscored.

Item 34 represents a contact device for controlling the connection and disconnection of counter-signal source 32 to the loop. Typically, this contact device is open. When cycled, it closes, then re-opens. It is shown open in FIG. 3A and in FIG. 4A. It is shown closed in FIG. 3B and in FIG. 4B.

Figure 3A:
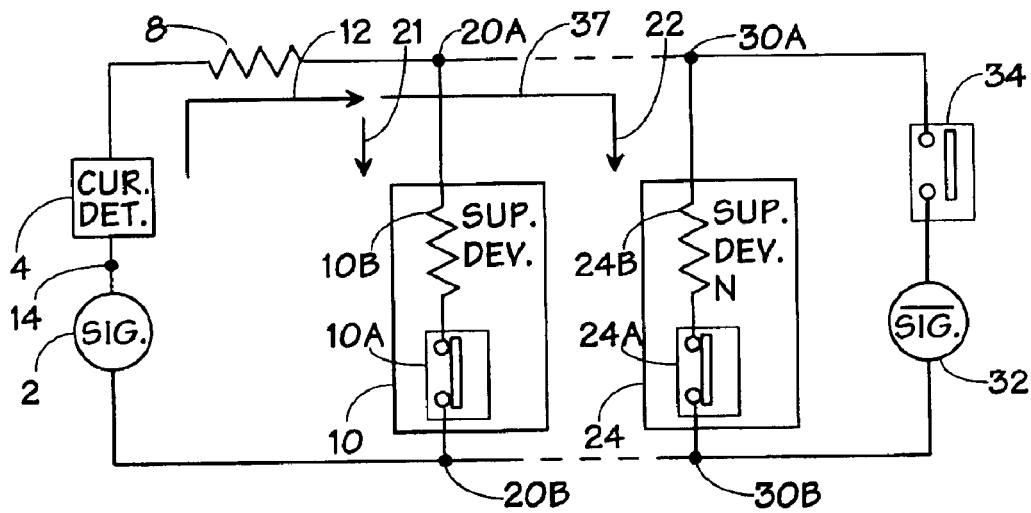
FIG. 3A and FIG. 3B are block diagrams, each illustrating a basic supervisory loop with a loop current, having component currents feeding a multiplicity of supervised devices, and having a contact-controlled counter-signal source connected in parallel with the multiplicity of supervised devices.
Figure 3B:
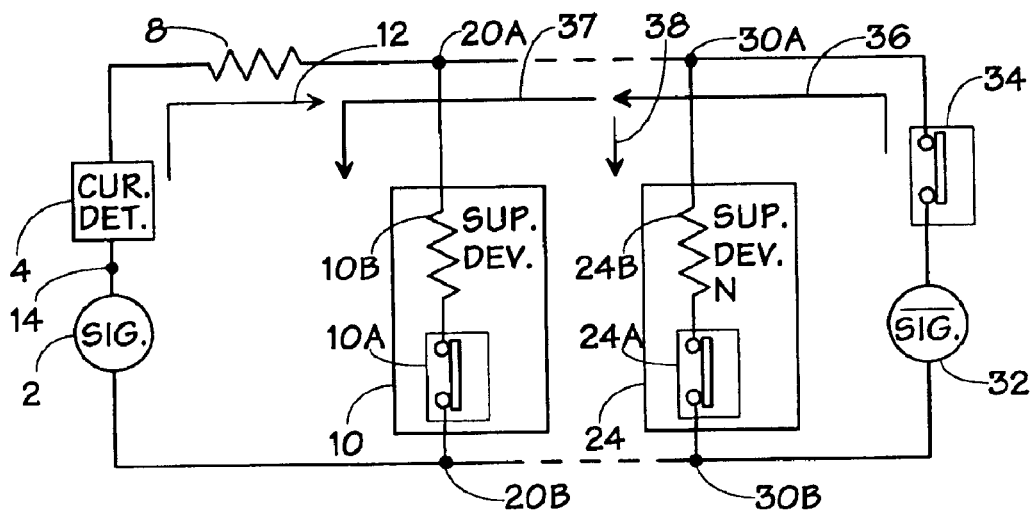

Item 36 designates the current generated by counter-signal source 32 in FIG. 3B.

Item 37 designates the component of current 36 that flows through supervised device 10.

Item 38 designates the component of current 36 that flows through supervised device 24.

Points 40A and 40B are the two connection points of counter-signal source 32 to loop 6C in FIG. 4A and in FIG. 4B.

Item 42 designates the current generated by counter-signal source 32 in FIG. 4B.

Item 43 designates the component of current 42 that flows through supervised device 10.

Item 44 designates the component of current 42 that flows through supervised device 24.

BACKGROUND OF THE INVENTION—PRIOR ART

The implementation of some features in various telecommunications systems require that a hook-flash be generated. An example on the Public Switched Telephone Network (PSTN) is three-way calling, also known as conference calling.

Figure 1:
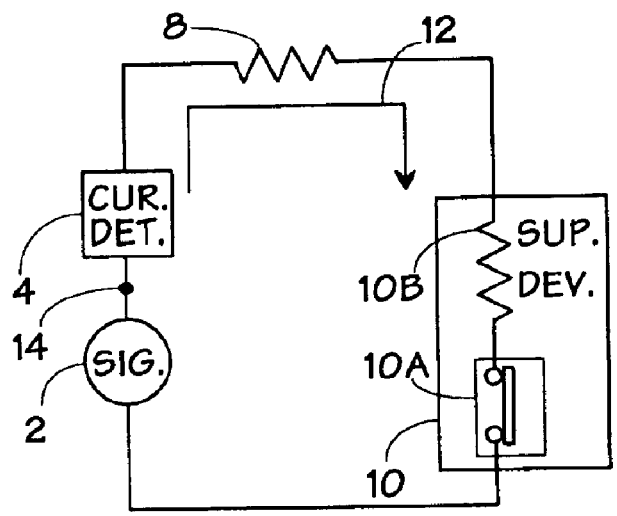
FIG. 1 is a block diagram illustrating a basic supervisory loop with supervisory signal current feeding a single supervised device.

Refer to FIG. 1. Supervised device 10 is connected to loop 6 in a continuous circuit with supervisory signal source 2, current detector 4, and impedance 8. When contact device 10A is closed, as it is shown, supervised device 10 is in the off-hook state, and supervisory signal source 2 generates signal current 12 which flows around loop 6 through current detector 4. When contact device 10A is cycled, a hook-flash is created in the loop, and the hook-flash is detected by current detector 4.

Applying only prior art, a hook-flash cannot be generated by a device on a telecommunications loop if another device is off-hook on that loop at the same time.

Figure 2:
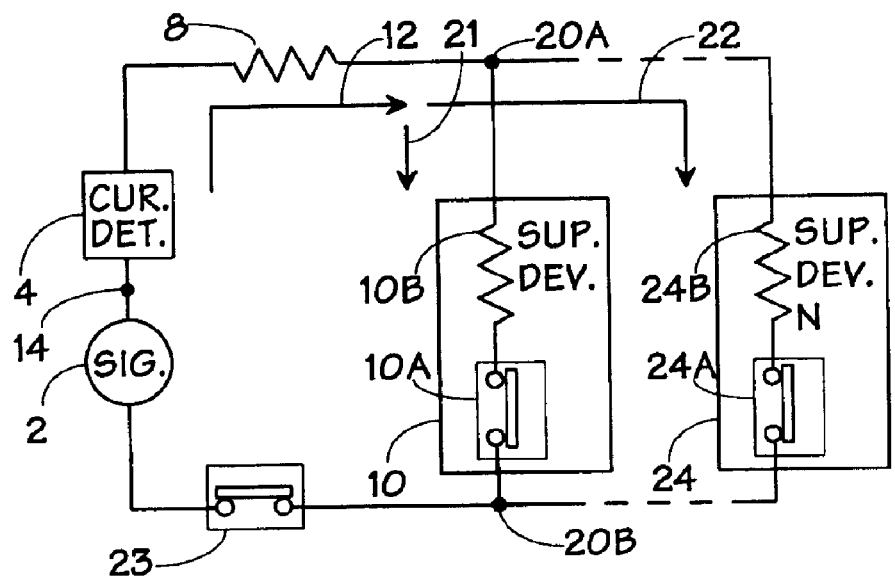
FIG. 2 is a block diagram illustrating a basic supervisory loop with a loop current having component currents feeding a multiplicity of supervised devices, and having a contact device in series with the multiplicity of supervised devices.

This can be seen by referring to FIG. 2. Supervised device 10 is connected to loop 6A, completing a circuit with supervisory signal source 2, current detector 4, and impedance 8. In addition, supervised device 24 (typifying any practicable number of such devices) is connected in parallel with supervised device 10, and contact device 23 has been added in series in loop 6A in such a manner that it is capable of interrupting all current flowing through current detector 4 when it is opened.

When contact device 10A and contact device 24A, in addition to contact device 23, are all closed, as they are shown, supervised device 10 and supervised device 24 are each in the off-hook state, and supervisory signal source 2 generates signal current 12, which flows around loop 6A through current detector 4. Signal current 12 then splits into component 21, which flows through supervised device 10, and component 22, which flows through supervised device 24.

A hook-flash cannot be created in the loop by individually cycling either contact device 10A or contact device 24A, because the magnitude of the signal current through current detector 4 and the remaining off-hook device is sufficient to prevent a detection breach in loop 6A.

It is possible, however, to generate a hook-flash in loop 6A. When contact device 23 is cycled, a hook-flash is created in the loop, because a threshhold breach is created when all current through current detector 4 is cut off.

Unfortunately, if installed in a typical PSTN telephone loop, contact device 23 would have to be installed in series in that loop between all supervised devices connected to the loop and current detector 4. It cannot simply be plugged into any available jack in parallel with the loop's supervised devices, or it will not be capable of generating a hook-flash, as has just been shown. The ability to make such an installation cannot reasonably be expected of most persons not skilled in electrical or telephony work. Consequently, services and features requiring hook-flash generation under the off-hook loop conditions described can only be implemented by dispatching a skilled installer, at significant expense, to install contact device 23. This is a definite disadvantage to marketers of such features and services, because the added expense can be sufficient to make the feature or service unfeasible.

It is a goal of this invention to describe a means for, and method of, simulating a hook-flash on a supervisory loop when connected to that loop at any point on the other side of current detector 4 from supervised signal source 2, not in series with, and regardless of the presence of, any practicable number of off-hook supervised devices also connected to that loop, and without having to open the loop to do so.

Such a device might then be installed by simply plugging it into any convenient, available jack in parallel with one or more telephony supervised devices. Typically, an unskilled person would be able to install such a device. Consequently, services and features requiring hook-flash initiation would then be implementable and marketable by simply mailing such a device to the end user with a set of instructions, eliminating the need to dispatch a skilled installer, at much greater expense, to that end user's installation site.

DETAILED DESCRIPTION AND PREFERRED EMBODIMENT

In FIG. 3A, loop 6B is illustrated. Loop 6B is similar to loop 6A in FIG. 2, except contact device 23 has been eliminated, and counter-signal source 32, in series with contact device 34, has been added in parallel with supervised device 10 and supervised device 24 and on the other side of current detector 4 from supervised signal source 2.

When contact device 10A and contact device 24A are closed, as they are shown, supervised device 10 and supervised device 24 are each in the off-hook state. Loop 6A is thereby completed, and supervisory signal source 2 generates signal current 12, which flows around loop 6A through current detector 4, then splits into current component 21, which flows through supervised device 10, and current component 22, which flows through current device 24.

A hook-flash cannot be created in the loop by individually cycling either contact device 10A or contact device 24A, because the magnitude of the signal current through current detector 4 and the remaining device is sufficient to prevent a detection breach in loop 6A.

In FIG. 3B, contact device 34 is closed, and counter-signal source 32 is connected to the loop. For a counter-signal source that is precisely matched to the supervisory signal source, the magnitude of counter-signal source 32 is always exactly equal, but opposite, to the magnitude of signal source 2. Under such conditions, Kirchoff's Second Law dictates that there can be no current flow through current detector 4. Hence a threshhold breach occurs, and a hook-flash is created on the loop.

FIG. 3A depicts loop 6B when counter-signal source 32 is not connected to the loop. Under the conditions illustrated, maximum current will flow around the loop and through current detector 4.

Typically, the maximum value of PSTN loop currents is about 6 times the minimum value, and the loop current threshhold is about ¾ of the minimum. Hence, if I represents the detection threshhold current value, then the maximum value of any PSTN loop current will be 8I. In the following analyses, let E represent the voltage of supervisory signal source 2, and Ec represent that of counter-signal source 32.

For a counter-signal source that is not precisely matched to the supervisory signal source, it will be evident to the reader that the value of current 12 will always be directly proportional to the algebraic sum of the voltages generated by supervisory signal source 2 and counter-signal source 32. Hence, for values of Ec that are less than E:

$$I/(E-Ec)=8I/(E-0)$$

which can be simplified to:

$$Ec=(\%)E$$

For a DC supervisory signal, when current detector 2 does not differentiate between a current flow in one direction as opposed to the other, it is also important to determine the maximum voltage that can be output by counter-signal source 32. For values of Ec greater than E, loop current will flow in the opposite direction than for values of Ec less than E. Consequently, the value of I will be negative, while the value of 8I will remain positive, and:

$$-I/(E-Ec)=8I/(E-0)$$

which can be simplified to:

$$Ec=(\%)E$$

These two limits equations can be combined into the following PSTN tolerance specification for an effective counter-signal source:

$$Ec=E(+/-)(\tfrac{1}{8})E$$

which can also be expressed as:

$$Ec=E(+/-)12.5\%$$

This is a highly practicable specification. Typically, supervisory signal source 2, on the PSTN, outputs a supervisory signal of 48VDC+/−2DCV, a tolerance of (+/−)4.2%. A very great number of power supplies, produced to meet this standard, are available on the market at low cost due to their high availability. Yet, to be effective, counter-signal source 32 must output a signal of 48VDC(+/−)12.5%, a significantly less stringent specification.

The maximum current around loop 6B in FIG. 3 is precisely identical to that around loop 6C in FIG. 4, because loop 6B is precisely identical to loop 6C when contact device 34 is open, disconnecting signal source 32 from the loop.

Similarly, for a counter-signal source that is precisely matched to the supervisory signal source, the magnitude of counter-signal source 32 is always exactly equal, but opposite, to the magnitude of signal source 2. As was true for FIG. 3B, under such conditions, Kirchoff's Second Law dictates that there can be no current flow through current detector 4. Hence a threshhold breach occurs, and a hook-flash is created on the loop.

The same subsequent reasoning that was applied to FIG. 3B will result in precisely the same PSTN tolerance statement for FIG. 4B:

$$Ec=E(+/-)(\tfrac{1}{8})E$$

Hence, FIG. 4A and FIG. 4B illustrate that, essentially, it doesn't matter where counter-signal source 32 is connected to a loop. The result will be the same: such means and method will simulate a hook-flash on a supervisory loop when connected to that loop at any point on the other side of current detector 4 from supervised signal source 2, not in series with, and regardless of the presence of, any practicable number of off-hook supervised devices also connected to that loop, and without having to open the loop to do so.

Such means and method can be implemented by simply plugging such means into any convenient, available jack in parallel with one or more telephony supervised devices. Typically, an unskilled person would be able to install such means. Consequently, services and features requiring hook-flash initiation would then be implementable and marketable by simply mailing such means to the end user with a set of instructions, eliminating the need to dispatch a skilled installer, at much greater expense, to that end user's installation site.

In addition, it will be apparent to the reader that contact device 34 can be a manually- or automatically-operated circuit opening-and-closing means. One example of such a manually-operated circuit opening-and-closing means is a pushbutton, cycled by a person. One example of an automatically-operated circuit opening-and-closing means is an electrical relay. Such a relay would operate in response to the occurrence of an event, and would be cycled by associated controlling means and method. One example of such an event is the generation of a signal, transmitted over the PSTN, for the purpose of causing a hook-flash in the loop at the receiving end. Neither the controlling means and method nor the signaling means and method are a part of this invention, but can be accomplished by any of a wide variety of means and methods currently available on the market.

I claim:

1. A method for producing a hook-flash on a loop, said loop incorporating a supervisory signal circuit that includes:

a source-detector complement comprised of a supervisory signal source in series with a supervisory current threshhold detector;

at least one supervised device connected to the loop across said source-detector complement in series with at least one intervening element of distributed impedance of the loop;

a manually-operable, normally-open contact device in series with a counter-signal source, connected to the loop across the source-detector complement in series with at least one element of said at least one intervening element of distributed impedance of the loop; and a loop current produced by said supervisory signal source through said supervisory current threshhold detector and through at least one closed contact device within said at least one supervised device and through said at least one element of the at least one intervening element of distributed impedance of the loop;

and a timed duration, manual cycling of said manually-operable, normally-open contact device in series with said counter-signal source that imposes on the loop a counter voltage that impedes said loop current through the supervisory current threshhold detector sufficiently to cause a supervisory threshhold breach for said timed duration, thereby producing the hook-flash on the loop.

2. A method for producing a hook-flash on a loop, said loop incorporating a supervisory signal circuit that includes:

a source-detector complement comprised of a supervisory signal source in series with a supervisory current threshhold detector;

at least one supervised device connected to the loop across said source-detector complement in series with at least one intervening element of distributed impedance of the loop;

an event-triggerable, automatically-operated, normally-open contact device in series with a counter-signal source, connected to the loop across the source-detector complement in series with at least one element of said at least one intervening element of distributed impedance of the loop; and a loop current produced by said supervisory signal source through said supervisory current threshhold detector and through at least one closed contact device within said at least one supervised device and through said at least one element of the at least one intervening element of distributed impedance of the loop;

and a timed duration, event-triggered cycling of said event-triggerable, automatically-operated, normally-open contact device in series with said counter-signal source that imposes on the loop a counter voltage that impedes said loop current through the supervisory current threshhold detector sufficiently to cause a supervisory threshhold breach for said timed duration, thereby producing the hook-flash on the loop.

* * * * *